(12) United States Patent
Antoun et al.

(10) Patent No.: US 9,514,312 B1
(45) Date of Patent: Dec. 6, 2016

(54) LOW-MEMORY FOOTPRINT FINGERPRINTING AND INDEXING FOR EFFICIENTLY MEASURING DOCUMENT SIMILARITY AND CONTAINMENT

(71) Applicant: Symantec Corporation, Mountain View, CA (US)

(72) Inventors: Ramzi Abi Antoun, San Francisco, CA (US); Stefano Emiliozzi, San Francisco, CA (US); Yuval Tarsi, Lafayette, CA (US); Craig Olinsky, Sausalito, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/479,205

(22) Filed: Sep. 5, 2014

(51) Int. Cl.
*G06F 21/60* (2013.01)
*G06F 17/30* (2006.01)

(52) U.S. Cl.
CPC ......... *G06F 21/60* (2013.01); *G06F 17/30097* (2013.01); *G06F 17/30109* (2013.01); *G06F 21/604* (2013.01)

(58) Field of Classification Search
CPC .. G06F 21/60; G06F 21/604; G06F 17/30109; G06F 17/30097
See application file for complete search history.

(56) References Cited

U.S. PATENT DOCUMENTS

| | | | |
|---|---|---|---|
| 8,250,085 B1 * | 8/2012 | Satish | G06F 21/552 707/758 |
| 8,359,472 B1 | 1/2013 | Ren et al. | |
| 2005/0256974 A1 * | 11/2005 | Teodosiu | H04L 69/04 709/247 |
| 2008/0133446 A1 * | 6/2008 | Dubnicki | G06F 17/30159 |
| 2011/0035805 A1 * | 2/2011 | Barkan | G06F 21/10 726/26 |

(Continued)

OTHER PUBLICATIONS

Saul Schleimer, Daniel S. Wilkerson, and Alex Aiken, "Winnowing: local algorithms for document fingerprinting". In Proceedings of the 2003 ACM SIGMOD international conference on Management of data (SIGMOD '03). ACM. New York, NY, USA, 76-85., 2003. 10 pages.

(Continued)

*Primary Examiner* — Jung Kim
*Assistant Examiner* — Thomas Ho
(74) *Attorney, Agent, or Firm* — Wilmer Cutler Pickering Hale and Dorr LLP

(57) ABSTRACT

A method and system for low-memory footprint fingerprinting and indexing for efficiently measuring document similarity and containment are described. A method may include extracting, by a processor, content from a set of one or more data files. The method may also determine a size of the content and apply a hash function to the content to generate multiple hashes. The method selects a constrained set of the hashes to generate a fixed-size fingerprint representative of the content when the size of the content is greater than a threshold size. The method stores the fixed-size fingerprint representative of the content in an endpoint index for at least partial file content matching by an endpoint device. The method may employ a statistical-based optimization to speed-up query time.

20 Claims, 8 Drawing Sheets

(56) References Cited

U.S. PATENT DOCUMENTS

2014/0259157 A1* 9/2014 Toma ................. H04L 63/1408
                                                    726/22
2014/0279956 A1* 9/2014 Trimble ................ G06F 3/0641
                                                    707/692

OTHER PUBLICATIONS

Andrei Z. Broder, "On the resemblance and containment of documents", In Proceedings of Compression and Complexity of Sequences, pp. 21-29, Jun. 11-13, 1997. 9 pages.

Andrei Z. Broder. "Identifying and Filtering Near-Duplicate Documents". In Proceedings of the 11th Annual Symposium on Combinatorial Pattern Matching (COM '00), London, UK 1-10, 2000. 10 pages.

Tamraparni Dasu, Theodore Johnson, S. Muthukrishnan, and Vladislav Shkapenyuk. "Mining database structure; or how to build a data quality browser". In Proceedings of the international conference on Management of data (SIGMOD '02). ACM New York, NY, USA, 240-251, 2002. 12 pages.

Henning Köhler, "Estimating Set Intersection using Small Sample," Proc. 33rd Australasian Computer Science Conference (ACSC 2010), 2010, pp. 71-78, Australian Computer Society, Inc., Brisbane, Australia.

* cited by examiner

LOW-MEMORY FOOTPRINT FINGERPRINTING AND INDEXING FOR EFFICIENTLY MEASURING DOCUMENT SIMILARITY AND CONTAINMENT

BACKGROUND

An Enterprise, such as, a business organization, can store data that may have sensitive content. Such sensitive data can come in the form of private or company information, intellectual property (IP), financial or patient information, credit-card data, and other information depending on the business and the industry. Data loss prevention (DLP) solutions generally detect sensitive data in documents and prevent unauthorized access, saving and/or sharing of the sensitive data. Traditional DLP solutions typically prevent unauthorized access, saving and/or sharing of the sensitive data by monitoring, detecting and blocking sensitive data while in-use (endpoint actions), in-motion (network traffic), and at-rest (data storage). The sensitive data may be stored in digital files. In order to prevent confidential data loss, DLP solutions can create an index of index entries for exact file and partial content matching. The DLP system uses fingerprinting algorithms, such as a one-way hash function, to create fingerprints of the files to be protected. The fingerprints are stored in an index. From a high level perspective, the process of creating a fingerprint includes mapping a larger data item, such as a digital file, to a relatively short set of bytes, known as the fingerprint. For detection, the DLP system creates a fingerprint of a current document and compares the fingerprint against the index for exact file and partial content matching.

SUMMARY

Technologies for low-memory footprint fingerprinting and indexing for efficiently measuring document similarity and containment are described. A method may include extracting, by a processor, content from a set of one or more data files to be protected by a data loss prevention (DLP) policy. The method may also include determining, by the processor, a size of the discrete content. The method may apply, by the processor, a hash function to the discrete content to generate a plurality of hashes. The method may then select, by the processor, a constrained set of the plurality of hashes to generate a fixed-size fingerprint representative of all the content when the size of the content is greater than a threshold size. The method may determine, by the processor, a number of the plurality of hashes based on the size when the size of the discrete content is equal to or less than the threshold size. The method may select, by the processor, a limited set of the plurality of hashes to generate a limited-size fingerprint representative of the entire original file when the size of the discrete content is equal to or less than the threshold size. The method may then store the fixed-size fingerprint representative or the limited-size fingerprint representative of the data file in an endpoint index for at least partial file content matching by an endpoint device.

In one embodiment, the fixed-size fingerprint representative of the discrete content can be a number for the constrained set of hashes.

In one embodiment, the endpoint index comprises a correlation of a plurality of fixed-size fingerprint representative or limited-sized signature representative of the discrete content to a plurality of data files that include any of the plurality of fixed-size fingerprint representative or limited-sized signature representative of the discrete content.

In one embodiment, the hash function comprises generating exact-file signatures of the set of one or more data files and stores the exact-file signatures in the endpoint index for exact-file matching by the endpoint device.

In one embodiment, the generating exact-file signatures of the set of one or more data files comprises determining whether the content extracted comprises a plurality of text or a plurality of non-text, applying a cryptographic hash function to the discrete content to the plurality of non-text, and applying the hash function to the discrete content to the plurality of text.

In one embodiment, applying the hash function to the discrete content comprises normalizing the content to generate a plurality of alpha numeric characters, applying a rolling k-gram operation to the plurality of alpha numeric characters, and applying a rolling hash function.

In one embodiment, the method further includes extracting statistical information to model a distribution of the smallest hash values found in the index structure and selecting a query threshold based on the distribution. The method may employ a statistical-based optimization to speedup query time as described herein.

Further, a system for low-memory footprint fingerprinting and indexing for efficiently measuring document similarity and containment is described. An exemplary system may include a memory and a processor coupled to the memory. The processor is configured to include extracting content from a set of one or more data files to be protected by a data loss prevention (DLP) policy. The processor is also configured to include determining a size of the discrete content. The processor is configured to apply a hash function to the content to generate a plurality of hashes. The processor is then configured to select a constrained set of the plurality of hashes to generate a fixed-size fingerprint representative of the content when the size of the content is greater than a threshold size. The processor is configured to determine a number of the plurality of hashes based on the size when the size of the content is equal to or less than the threshold size. The processor is configured to select a limited set of the plurality of hashes to generate a limited-size fingerprint representative of the content when the size of the content is equal to or less than the threshold size. The processor is configured to then store the fixed-size fingerprint representative or the limited-size fingerprint representative of the content in an endpoint index for at least partial file content matching by an endpoint device.

In addition, a non-transitory computer readable storage medium for low-memory footprint fingerprinting and indexing for efficiently measuring document similarity and containment is described. The non-transitory computer readable storage medium includes instructions that, when executed by a processor, cause the processor perform the operations described above. In addition, an apparatus comprising a memory device and a processor coupled to the memory device is described.

BRIEF DESCRIPTION OF THE DRAWINGS

The present disclosure will be understood more fully from the detailed description given below and from the accompanying drawings of various implementations of the disclosure which, however, should not be taken to limit the invention to the specific embodiments, but are for explanation and understanding only.

DETAILED DESCRIPTION

Figure 1:
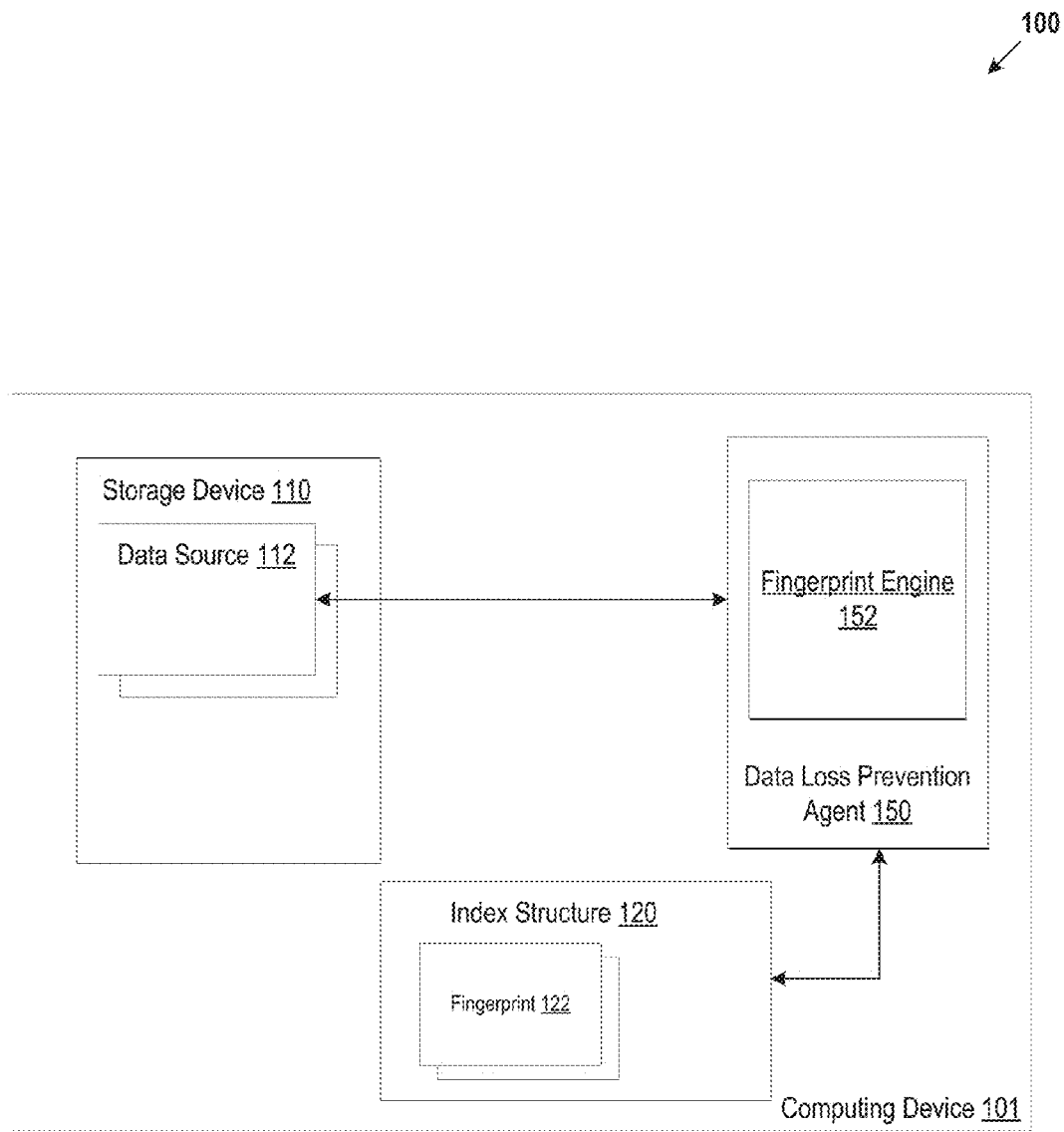
FIG. 1 illustrates example system architecture in which various embodiments may operate.

The present disclosure is direction to fingerprinting and indexing for efficiently measuring document similarity and containment with a low-memory footprint is described. DLP generally detects sensitive data in documents and prevents unauthorized access, saving and/or sharing of the sensitive data. The embodiments described herein detect sensitive data using fingerprinting algorithms to create fingerprints of data sources and indexing the fingerprints for querying and comparing against other fingerprints. Sensitive data hereinafter refers to data that is to be protected. Examples of sensitive data can include, and are not limited to, private or company information, intellectual property (IP), financial or patient information, credit-card data, and other information depending on the business and the industry. Sensitive data can be stored in digital files (hereinafter referred to as "file" or "files").

As described above, the fingerprint of each digital file can be compared with fingerprints of other files to determine if a file has been duplicated. For example, users may attempt to obtain the sensitive data is by copying exact duplicates of the digital files to an unsecure location. DLP solutions can compare the fingerprints of the digital files being copied to a Universal Serial Bus (USB) flash drive to an index of containing the fingerprints of all sensitive data. If a match is found, the file may be flagged as sensitive content and removed or quarantined. Scanning for exact matches requires relatively low resources and can perform reasonably well on endpoint devices (e. g. desktops, laptops, tablets, mobile phones, etc.). However, exact matching is restrictive and will not trigger a match when the slightest change to the content is made. Other conventional fingerprinting methods, such as those used to measure resemblance or containment, extract a more flexible fingerprint from every file which allows detection of files with similar content. Resemblance (or similarity) arises when files are very similar in content, yet may have small changes between them. Containment arises when files are not duplicated, but sensitive content is embedded inside another digital file. Protection of such sensitive data is extremely important, as users may attempt to bypass detection by embedding the sensitive data in larger files, or making small changes to the sensitive data. Fingerprints, which usually consist of a set of integer hash values, should offer two attributes. First, the fingerprints should remain unchanged if the file goes through minor changes, such as formatting changes. Second, the fingerprints should gradually degrade as the file is progressively edited. Conventional fingerprinting methods used to measure document resemblance and containment typically use considerably more system resources to perform well, and thus, are typically performed by server computing systems that are not resource constrained. Endpoints (such as desktops, laptops, tablets, mobile phones, or the like) generally do not have the resources to efficiently run conventional solutions. Conventional solutions are inefficient for endpoint enforcement because the size of the fingerprints tend to grow proportionally with the size of the sensitive data. The larger fingerprints make comparisons more resource intensive and time consuming. Unlike conventional solutions, the embodiments described herein may provide the benefit of fingerprinting and indexing in an efficient manner, saving valuable processing resources and time, which can be run on devices with limited resources such as endpoints, or even in a virtual machine or a cloud computing system.

For example, a user on an endpoint may wish to protect a set of files on the endpoint. A DLP Agent running on the endpoint contains a Fingerprint Engine. The Fingerprint Engine can create a fingerprint for each file. The fingerprints are stored in an index structure. Subsequent files and their fingerprints can be used to query the index structure for exact matches, resemblance (e. g. document similarity), containment (e.g., sensitive data embedded in a document), or for other purposes. Generally, in conventional solutions, fingerprints tend to scale in size proportionally with the size of the file. Unlike conventional solutions, the embodiments described herein provide an advantage in that the fingerprint sizes are capped at a maximum size (referred to herein as "fixed-size fingerprints" and "limited-size fingerprints"). For example, the fingerprint for a file of size 5 kilobytes (KB) would be the same size (e. g. 100 hashes) as the fingerprint for a file 200 times larger (1 megabyte, or 1 MB), unlike conventional solutions in which the fingerprint for the 1 MB file would be proportionally 200 times larger as well. The resulting smaller fingerprint sizes result in smaller index structures, which in turn lead to less resource intensive queries.

FIG. 1 illustrates example system architecture 100, in accordance with various implementations. The system architecture 100 can include a computing device 101. The computing device 101 can include personal computers, laptops, netbooks, personal digital assistants (PDAs), mobile phones, tablets computers, network appliances, etc. The computing device 101 can include one or more data sources 112 stored in a storage device 110. The data sources 112 can include, and are not limited to, documents, spreadsheets, compressed files, or similar. The data source 112 can include sensitive data (e. g. credit card information, social security numbers, bank account numbers, or the like). The data source 112 can come in the form of files and hereinafter may be used interchangeably. The storage device 110 can be, and is not limited to, mass storage devices, such as magnetic or optical storage based disks, solid-state drives (SSDs) or hard drives. The storage device 110 can be persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

A data loss prevention (DLP) agent 150 can protect loss of data (e.g., data source 112). The DLP agent 150 can include a fingerprint engine 152 that can create a fingerprint 122 for the data source 112. The process of creating a fingerprint 122 is discussed in more detail below. The DLP agent can add the fingerprints 122 of sensitive data of data sources 112 to the index structure 120. For example, a user may have a large number of data sources 112 on the storage device 110. However, only a select number of data sources 112 need to be protected. For example, a user may have a number of sensitive files (e.g., an excel spreadsheet with credit card information, a word document with company trade secrets, or the like) on the hard drive that need to be protected. The user may also have a large number of files not deemed to be sensitive (e.g., operating system files, music files, or the like). The user may specify which files need to be protected. The fingerprint engine 152 can then create fingerprints 112 for those files and store the fingerprints 112 in the index structure 120. The index structure 120 can be used for querying, or comparing, fingerprints 122 of other data sources 112 with the fingerprints 112 of existing sensitive content. Querying will be discussed in further detail below.

Figure 2:
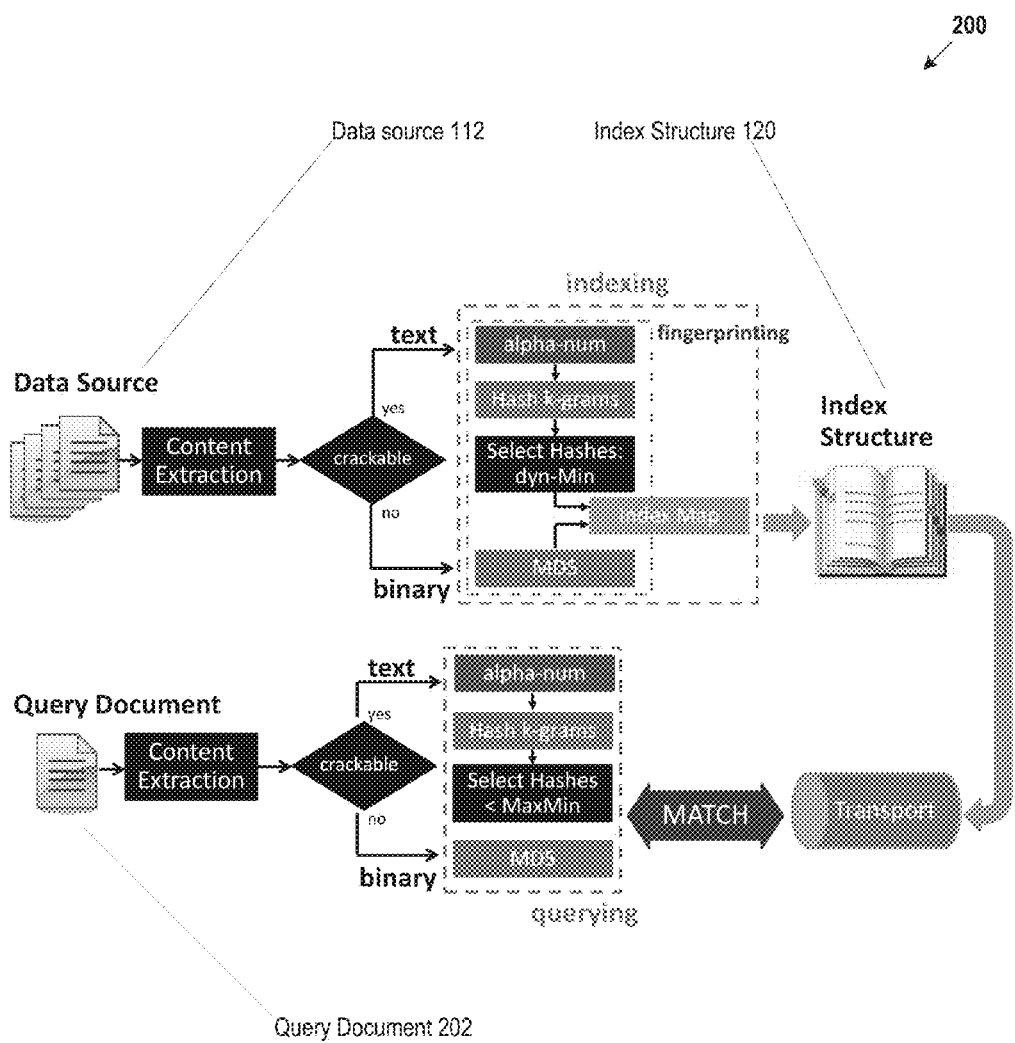
FIG. 2 is a flow diagram of a method of indexing for efficiently measuring document similarity and containment with a low-memory footprint and for querying according to one embodiment.

FIG. 2 is example system architecture 200, in accordance with various implementations. The system architecture 200 can reside in a computing device 101 in various implementations. The system architecture 200 illustrates the process of fingerprint and indexing for efficiently measuring document similarity and containment with a low-memory footprint according to one embodiment. The process may begin with the fingerprint engine 152 generating fingerprints 122 of a data source 112 (e. g. a set of word documents, excel spreadsheets, or the like). For example, the user wishes to protect a folder of sensitive word documents and excel spreadsheets. The process of generating a fingerprint itself may be illustrated in more detail in FIG. 3. Once the fingerprint 122 is created, it may be added to the index structure 120 by the fingerprint engine 152. The fingerprint may come in the form of a set of hash values. The index structure 120 may map every hash value to a number of documents that also contain the same hash values, which is an indication of a match of content in the documents. The process of mapping hash values allows for efficient querying of documents against the index structure 120 and providing one-to-all matching as opposed to simple one-to-one matching. In addition, during the indexing processing, the index structure 120 maintains a query threshold value, which is a value generated by the index structure 120. The query threshold value, also referred to herein as "MaxMin," represents the maximum of the smallest hashes of every fingerprint in the index structure 120. To generate MaxMin, the index structure 120 develops statistical information of the largest values in the set of smallest hash values found in any document, represented by its fingerprint, in the index structure 120. To further speed up the query process, hash values larger than MaxMin may be excluded from queries. Further, the MaxMin value may be computed as a large percentile of the set of smallest hash values selected from the files indexed. This computation may further speed up queries by avoiding a possible scenario where MaxMin happens to be a large value.

The system architecture 200 also illustrates the process of querying the index structure 120 for partial or complete matches of fingerprints 112. For example, a user may wish to detect sensitive content in a file. The file may be described as a query document 202, or a query file. A fingerprint for the query document 202 may be created. As mentioned above, the process of creating the fingerprint may be illustrated in detail in FIG. 3. Once created, the fingerprint for the query document may be compared to the index structure 120, which contains the fingerprints of the sensitive documents. The index structure 120 may then provide a list of all partial or complete matches found.

Figure 3:
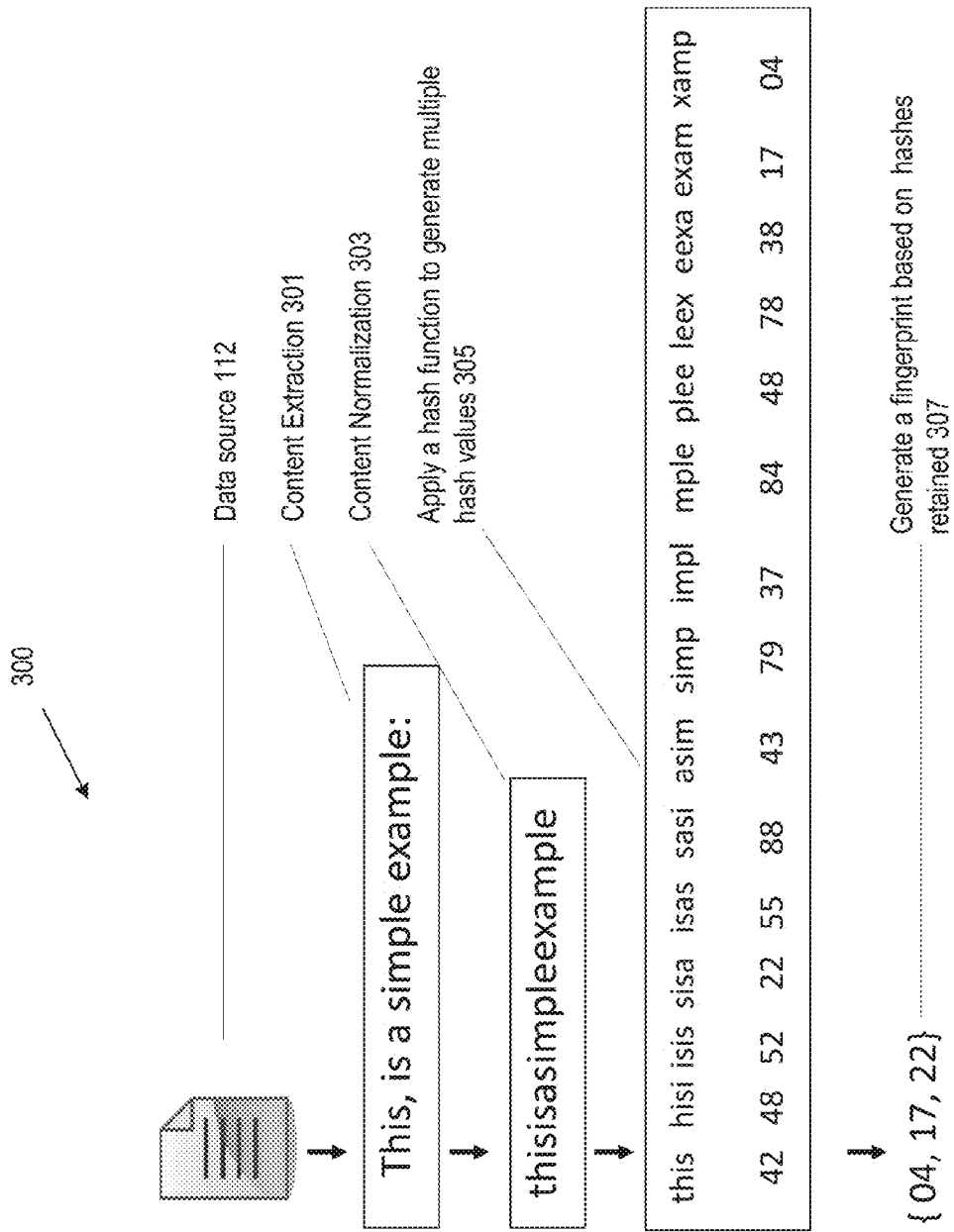
FIG. 3 illustrates fingerprinting and indexing a simple example for efficiently measuring document similarity and containment according to one embodiment.

FIG. 3 illustrates fingerprinting a simple example for efficiently measuring document similarity and containment according to one embodiment. Example 300 can be performed by processing logic that can comprise hardware (e.g., circuitry, dedicated logic, programmable logic, microcode, or the like), software (e.g., instructions run on a processor), or a combination thereof. In one implementation, example 300 is performed by a fingerprint engine 152. A data source 112 may be a document containing a simple sentence, "This, is a simple example:". The fingerprint engine 152 may perform a content extraction 301. The content extraction 201 may be the process of extracting the text from the document. Once the content is extracted, the fingerprint engine 152 may perform a content normalization 303 process, in which white spaces, punctuation, formatting, etc. are removed from the document, leaving a string of alpha-numeric characters. For example, above sentence would become "thisisasimpleexample" once the content normalization 303 process is complete. Next, the fingerprint engine 152 may apply a hash function to generate multiple hash values 305. A variety of hash functions may be used. For example, a rolling hash function may be applied to the string. The rolling hash function may divide the string into substrings of size k (e.g., k-grams). For example, the k-grams may be size 4. The first substring would begin with the first 4 characters (e.g., "this"). The next substring may drop the first letter, and then add the second letter (e.g., "hisi"). The following substrings will be represented in similar fashion accordingly. The substrings may be converted into a set of hash values via a polynomial hash function, or other hash function. Finally, once the hash values are generated, a fingerprint is generated based on the hashes retained 307. For example, the three smallest hashes may be retained to generate the fingerprint, represented as {04, 17, 22}.

Figure 4:
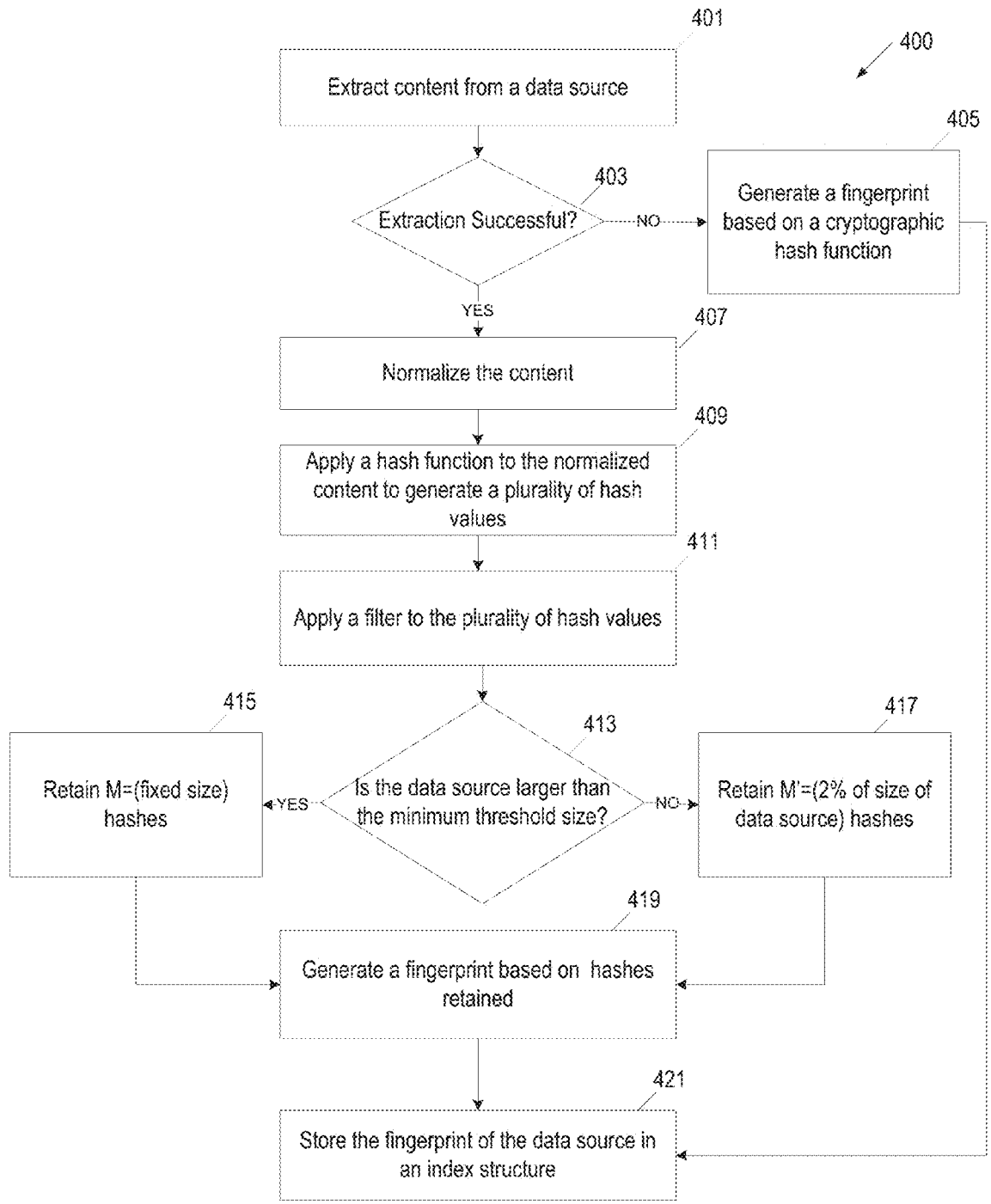
FIG. 4 is a flow diagram of a method of fingerprinting and indexing for efficiently measuring document similarity and containment with a low-memory footprint according to one embodiment.

FIG. 4 is a flow diagram of a method of fingerprinting and indexing for efficiently measuring document similarity and containment with a low-memory footprint according to one embodiment. Method 400 can be performed by processing logic that can comprise hardware (e.g., circuitry, dedicated logic, programmable logic, microcode, or the like), software (e.g., instructions run on a processor), or a combination thereof. In one implementation, method 400 is performed by a fingerprint engine 152.

At block 401, the fingerprint engine 152 extracts content from a data source 112. The data source may come in many forms, such as, and not limited to, documents, spreadsheets, text files, compressed files. At block 403, the fingerprint engine 152 determines whether the content extraction is successful. In one embodiment, the fingerprint engine 152 may successfully extract content from files which include alphanumeric characters, such as, and not limited to, documents, spreadsheets, text documents, and some compressed files. In another embodiment, the fingerprint engine 152 may unsuccessfully extract content from files, such as, and not limited to, images, videos, and some compressed files.

At block 405, the fingerprint engine 152 may generate a fingerprint for the files from which content is unsuccessfully extracted. Files from which content is unsuccessfully extracted may also be referred to as binary files, custom files, encapsulated files, or compressed files. The fingerprint may be based on a cryptographic hash function. A cryptographic hash function is a hash function which is considered practically impossible to recreate the input data from its hash value alone. For example, a cryptographic hash function may generate, and is not limited to, a MD5, SHA1, or SHA2 hash signature. Hash functions are commonly used in the industry for a wide variety of applications, such as to verify integrity of files or messages, password verification, file or data identifiers, or pseudorandom generation and key derivation. In one embodiment, the cryptographic hash function is used to provide the fingerprint for a binary file, or compressed file. For example, an image file (e.g., a jpeg image taken from a digital camera) does not contain text that can be extracted. The image file would be treated as a binary file. In one embodiment, the fingerprint engine 152 may generate a single MD5 based on the binary signature of the image file. The MD5 signature would then be sent to the index structure at block 421. The storage of the fingerprint of the data source in the index structure will be discussed in further detail at block 421.

At block 407, the fingerprint engine 152 may normalize the content which has been successfully extracted from the data source 112. As discussed above, normalization of content involves removal of white spaces, punctuation, formatting, etc. from the content, leaving a string of alphanumeric characters. An example of normalization of content is discussed above in the "thisisasimpleexample" example.

At block 409, the fingerprint engine 152 may apply a hash function to the normalized content to generate multiple hash values. For example, a rolling hash function may be applied to the string. The rolling hash function may divide the string into substrings of size k (e.g., k-grams). For example, the k-grams may be size 4. The first substring would begin with the first 4 characters (e.g., "this"). The next substring may drop the first letter, and then add the second letter (e.g., "hisi"). The following substrings will be represented in similar fashion accordingly. The substrings may be converted into a set of hash values via a polynomial hash function, or other hash function.

At block 411, the fingerprint engine 152 may apply a filter to the multiple hash values. In one embodiment, the filter may take the smallest M hashes from set of hash values, dependent on a minimum threshold size of the data source 112, where M is an integer value. At block 413, the fingerprint engine 152 determines if the data source is larger than the minimum threshold size. The minimum threshold size is an integer value. The minimum threshold size may be designated X kilobytes (KB), where X is an integer value. At block 415, the fingerprint engine 415 may retain a fixed number of M hashes. For example, for file sizes larger than X=5 KB, the filter may take the smallest M=100 hashes from the set of hash values. At block 417, the fingerprint engine 152 may take the smallest M' hashes from the set of hash values for files sizes smaller than X kilobytes, where M' is an integer value calculated to a percentage of X. For example, for file sizes smaller than 5 KB, the filter may take the smallest M' hashes, where M' is an integer value calculated to 2% of X. For example, for a file of size 4 KB, the filter may take the smallest N=80 hashes from the set of hash values, where N is equal to 2% of 4 KB.

At block 419, the fingerprint engine 152 generates a fingerprint 122 based on the retained hashes. In the example above, the fingerprint for "This, is a simple example:" would be {04,17,22}.

At block 421, the fingerprint engine 152 may store the fingerprint 122 of the data source 112 in an index structure 120. The fingerprint may come from a cryptographic hash function (e.g., MDA, SHA1, SHA2, or the like) from block 405. The fingerprint may also come from the fingerprint generated at block 419 based on M or M' hashes.

Figure 5:
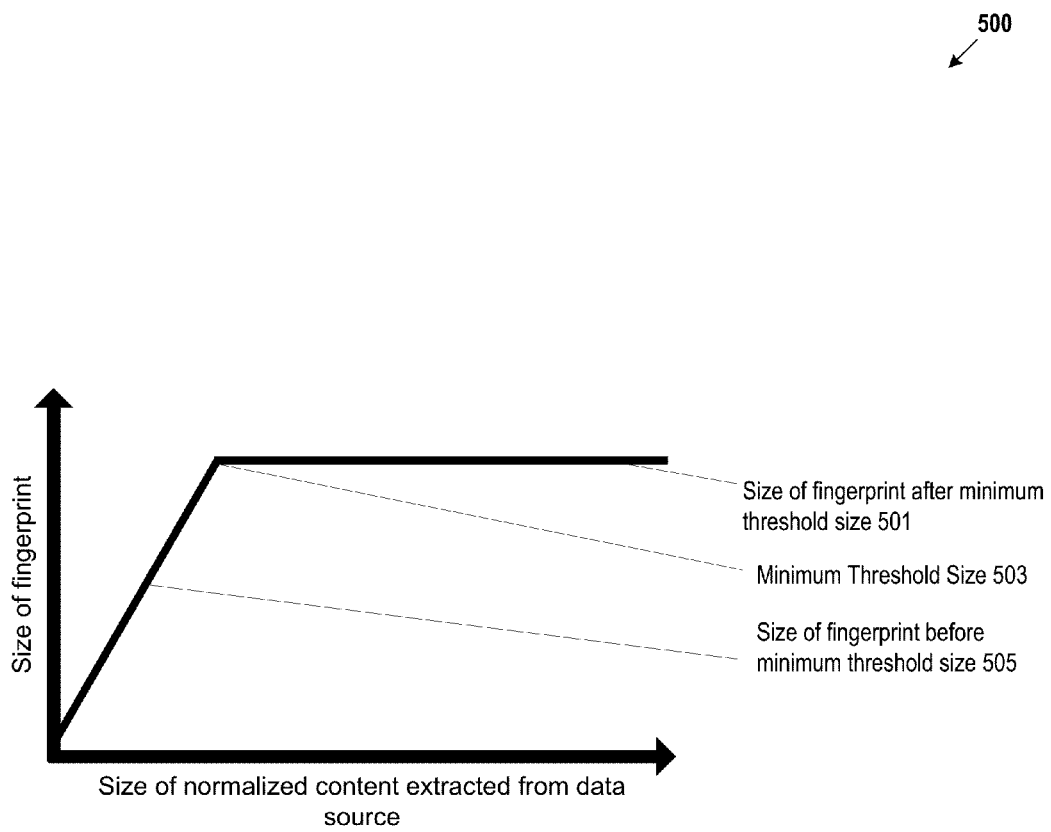
FIG. 5 is a graph illustrating growth of the size of the fingerprint for different sizes of data sources, according to one embodiment.

FIG. 5 is a graph illustrating growth of the size of the fingerprint for different sizes of data sources, according to one embodiment. As illustrated by the chart, the size of the fingerprint before a minimum threshold size 505 grows proportionally to the size of the normalized content extracted from the data source 112 until the size of the data source reaches a minimum threshold size 503. After the size of the normalized content extracted from the data source 112 reaches the minimum threshold size 503, the size of the fingerprint after the minimum threshold size 501 remains a fixed value. Continuing from the above example, if the minimum threshold size 503 is X=5 KB, any files smaller than 5 KB may retain the maximum of M'=(2% of X) hash values to generate its fingerprint 122. Any files larger than 5 KB may retain the maximum of M=100 hash values to generate its fingerprint 122. This provides an advantage over conventional hash-selection algorithms (e.g., winnowing, 0 modulo P, or the like), as fingerprints of conventional solutions will grow proportionally with the file size, no matter how large the file may be. For example, conventional solutions may generate a fingerprint of 20,000 hashes for a file of size 1,000 KB (or 1 MB). However, the fingerprint engine 152 may generate a fingerprint of 100 hashes, for the same file. Smaller fingerprints may lead to smaller index structures, which may lead to more efficient data storage and querying.

Figure 6:
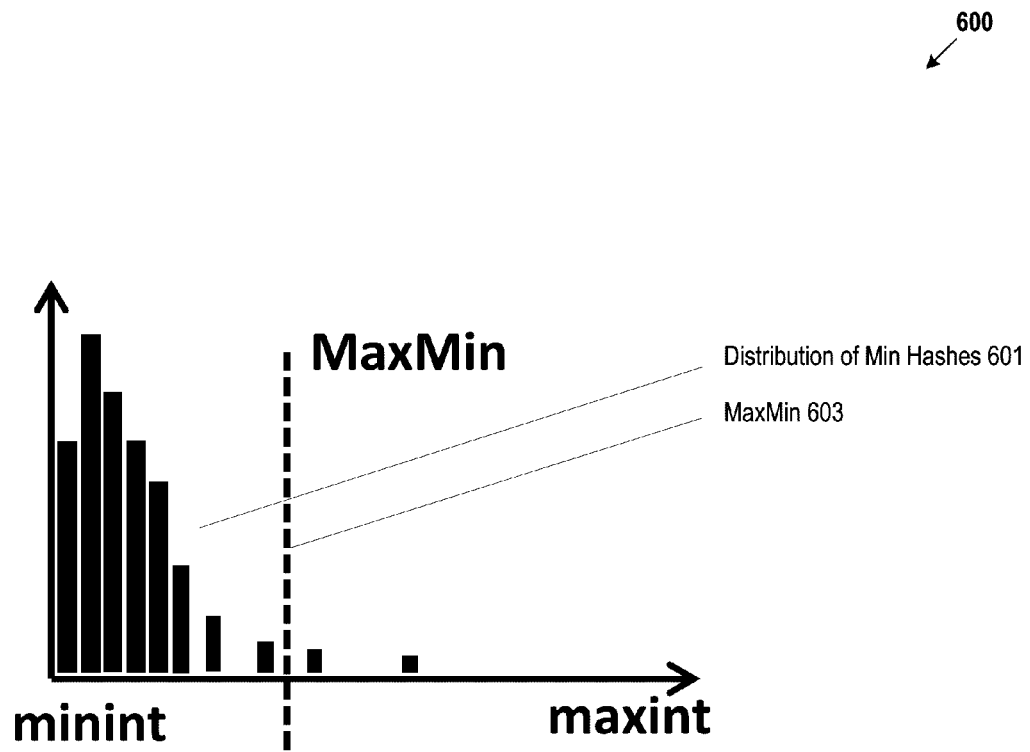
FIG. 6 is a graph illustrating a distribution of minimum hashes in an index structure and determining a query threshold value, according to various implementations.

FIG. 6 is a graph illustrating an example distribution of minimum hashes in an index structure and determining a query threshold value, according to various implementations. During the indexing process, the index structure 120 maintains a query threshold value, which is a value generated by the index structure 120. The query threshold value may be known as MaxMin 603. MaxMin 603 may represent the maximum of the smallest hashes of every fingerprint in the index structure 120. To generate MaxMin 603, the index structure 120 extracts statistical information to model the distribution of the smallest hash values found in any document, represented by its fingerprint 122, in the index structure 120. To further speed up the query process, hash values larger than the threshold value, MaxMin 603 may be excluded from queries. Further, the MaxMin 603 value may be computed as a q-quantile of all hash values selected from the files indexed. For example, the MaxMin 603 may be calculated at the $99^{th}$ percentile of all hash values selected from the index structure 120. This computation may further speed up queries by avoiding a possible scenario where threshold MaxMin 603 happens to be a large value.

Figure 7:
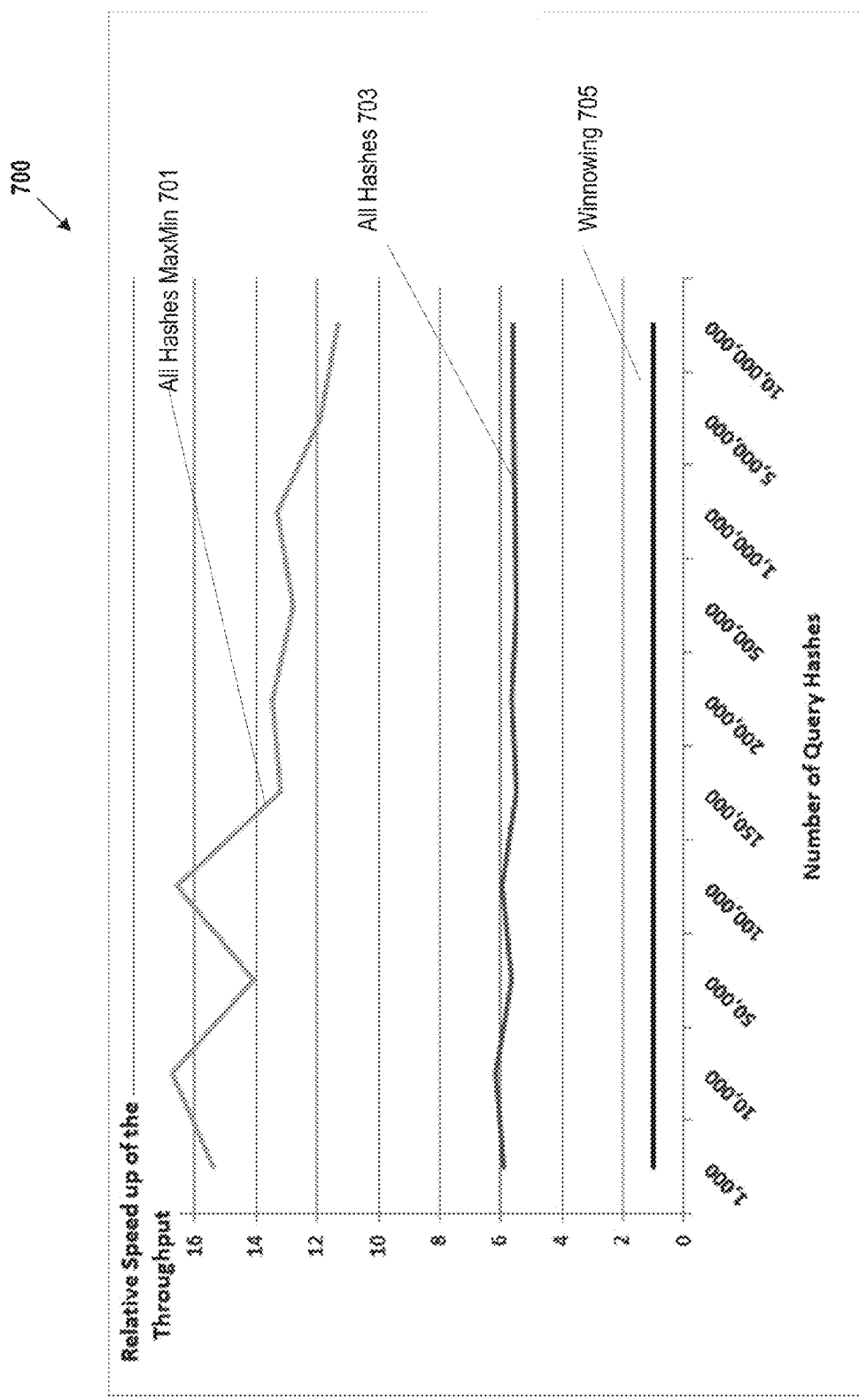
FIG. 7 is a graph illustrating the performance metrics of querying various fingerprinting processes in comparison with conventional solutions, in according with various implementations.

FIG. 7 is a graph illustrating the performance metrics of querying various fingerprinting processes in comparison with conventional solutions, in according with various implementations. The graph illustrates the speedup ratios using various implementations of fingerprinting and indexing for efficiently measuring document similarity and containment with a low-memory footprint according to one embodiment. A conventional implementation, such as winnowing 705, may provide a baseline throughput of X. All hashes 703, may be described as the process of taking the smallest M or M' hashes based on the size of the data source, without additional filter of the query threshold value (e.g., MaxMin 603). All hashes 703 provide a substantial advantage over conventional implementations with a relative speedup of the throughput of 6×. All Hashes MaxMin 701 adds the query threshold value filter (e.g., MaxMin 603) to All Hashes 703, and the relative speedup of the throughput results spike up to 11-17×. The throughput trends downward as the number of query hashes increases, however it is still well above any conventional solutions.

Figure 8:
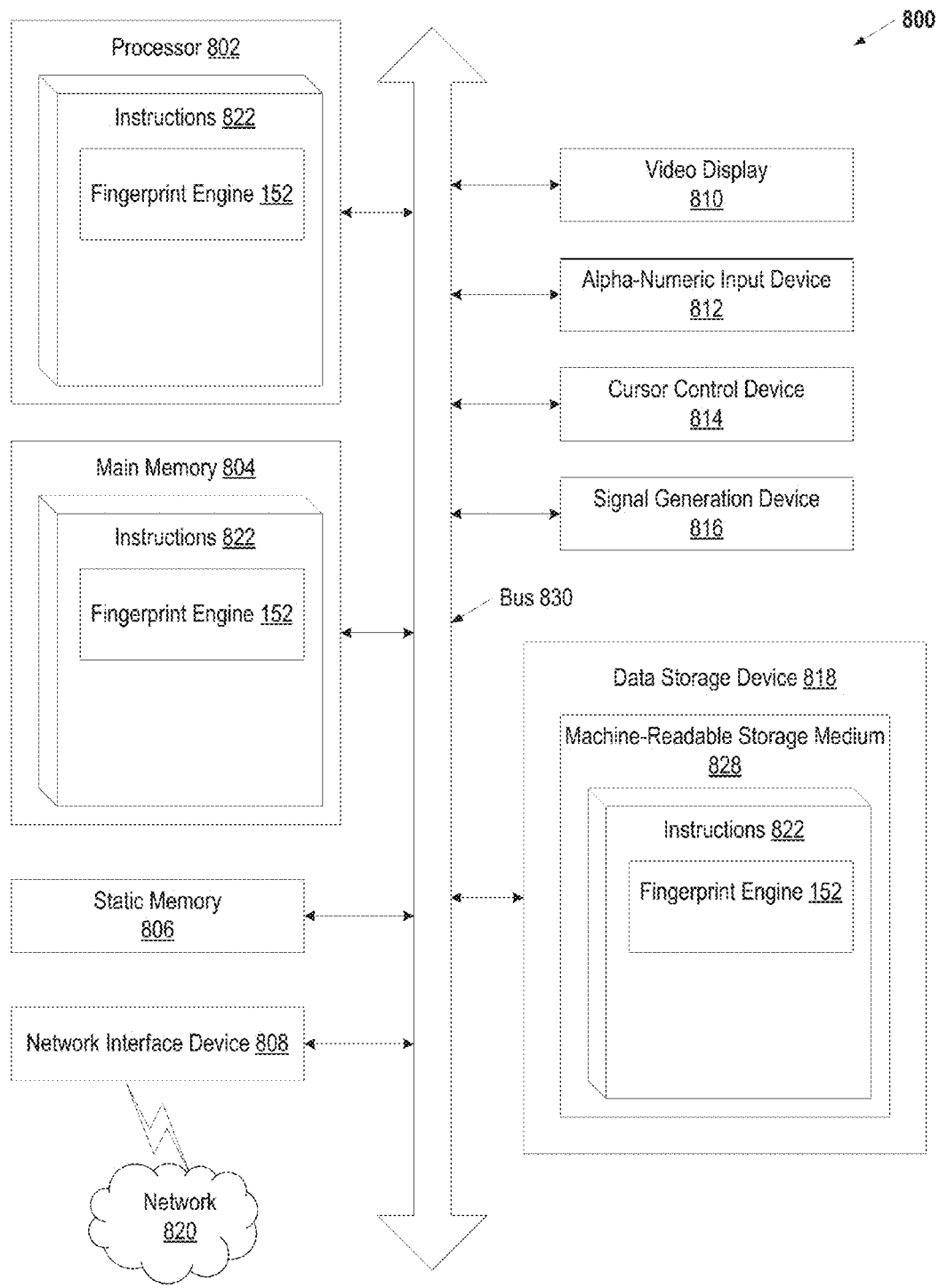
FIG. 8 is a block diagram of an example computer system that may perform one or more of the operations described herein.

FIG. 8 is a block diagram of an example form of a computing system 800 within which a set of instructions, for causing the machine to perform any one or more of the methodologies discussed herein, may be executed. The computing system 800 can be computing device 101 in FIG. 1. In alternative embodiments, the machine may be connected (e.g., networked) to other machines in a LAN, an intranet, an extranet, or the Internet. The machine may operate in the capacity of a server or a client machine in the client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 100 includes a processor 802, a main memory 804 (e.g., read-only memory (ROM), flash memory, dynamic random access memory (DRAM) such as synchronous DRAM (SDRAM), double data rate (DDR SDRAM), or DRAM (RDRAM), or the like), a static memory 806 (e.g., flash memory, static random access memory (SRAM), or the like), and a data storage device 818, which communicate with each other via a bus 808.

Processor 802 represents one or more general-purpose processors such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processors such as an application specific integrated circuit (ASIC), a field programmable gate array (FPGA), a digital signal processor (DSP), network processor, or the like. The processor 802 is configured to execute the processing logic for instructions 822 for performing the operations and steps discussed herein.

The computing system 800 may further include a network interface device 808. The computing system 800 also may include a video display unit 810 (e.g., liquid crystal display (LCD) or a cathode ray tube (CRT), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions 822 embodying any one or more of the methodologies or functions described herein. The instructions 822 may also reside, completely, or at least partially within the main memory 804 and/or within the processor 802 during execution thereof by the computing system 800, the main memory 804, and the processor 802 also constituting computer-readable media. The instructions may further be transmitted or received over a network 820 via the network interface device 808.

In one implementation, the instructions 822 include instructions for a fingerprint engine (e.g., fingerprint engine 152 in FIG. 1) and/or a software library containing methods that calls modules in a data loss prevention agent. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting" or "identifying" or "determining" or "allowing" or "denying" or "correlating" or "accessing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Implementations of the present invention also relate to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, and not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for use in data loss prevention comprising:
    extracting, by a processor, content from a set of one or more data files to be protected by a data loss prevention (DLP) policy designed to detect resemblance or containment relationships between two files even when their contents are not exact matches, wherein the content comprises sensitive data, and wherein the set of one or more data files comprises both sensitive data and non-sensitive data;
    determining, by the processor, a size of the content;
    applying, by the processor, a hash function to the content to generate a plurality of hashes;
    selecting, by the processor, a constrained set of the plurality of hashes to generate a fixed-size fingerprint representative of the content when the size of the content is greater than a threshold size;
    determining, by the processor, a quantity of hashes based on the size of the content when the size of the content is equal to or less than the threshold size, wherein the quantity is proportional to the size of the content and the determined quantity is less than the quantity of the plurality of hashes;
    selecting, by the processor, the determined quantity of hashes from the plurality of hashes to generate a limited-size fingerprint representative of the content when the size of the content is equal to or less than the threshold size; and
    storing the fixed-size fingerprint or the limited-size fingerprint in an endpoint index for at least partial file content matching by an endpoint device, wherein the endpoint index comprises at least one fixed-size fingerprint or limited-size fingerprint corresponding to sensitive data, and wherein the endpoint index may be used for querying fingerprints of other data sources with the fingerprints contained in the endpoint index to determine if the other data sources contain content corresponding to the extracted content.

2. The method of claim 1, wherein the endpoint index comprises a mapping of at least some of the selected hashes in the stored fixed-size fingerprint or stored limited-size fingerprint to the set of one or more data files to be protected that also include any of the plurality of fixed-size fingerprints or the limited-sized fingerprints representative of the content.

3. The method of claim 1, further comprising:
    applying, by the processor, a second hash function to each of the set of one or more data files to generate an exact-file fingerprint for use with a DLP further designed to detect exact matches, wherein the hash function comprises generating exact-file signatures of the set of one or more data files; and
    storing the exact-file fingerprints in the endpoint index for exact-file matching by the endpoint device.

4. The method of claim 3, wherein the generating the exact-file fingerprints of the set of one or more data files comprises:
    determining whether the content extracted comprises text data or non-text data;
    applying a cryptographic hash function to the non-text data; and
    applying the hash function to the text data.

5. The method of claim 1, further comprising:
    normalizing the content to generate a plurality of alpha numeric characters; and
    applying a k-gram operation to the plurality of alpha numeric characters, wherein applying the hash function comprises applying a rolling hash function.

6. The method of claim 1, further comprising:
    extracting statistical information to model a distribution of the quantity of hashes from the fingerprints stored in the endpoint index; and
    selecting a query threshold based on the distribution, wherein the query threshold is selected by determining the maximum value of a subset of the smallest hashes of the hashes stored in the endpoint index.

7. A system comprising:
    a memory; and
    a processor coupled with the memory, the processor to:
    extract content from a set of one or more data files to be protected by a data loss prevention (DLP) policy designed to detect resemblance or containment relationships between two files even when their contents are not exact matches, wherein the content comprises sensitive data and wherein the set of one or more data files comprises both sensitive data and non-sensitive data;
    determine a size of the content;
    apply a hash function to the content to generate a plurality of hashes;
    select a constrained set of the plurality of hashes to generate a fixed-size fingerprint representative of the content when the size of the content is greater than a threshold size;
    determine a quantity of hashes based on the size of the content when the size of the content is equal to or less than the threshold size, wherein the quantity is proportional to the size of the content and the determined quantity is less than the quantity of the plurality of hashes;

select the determined quantity of hashes from the plurality of hashes to generate a limited-size fingerprint representative of the content when the size of the content is equal to or less than the threshold size; and store the fixed-size fingerprint or the limited-size fingerprint in an endpoint index for at least partial file content matching by an endpoint device, wherein the endpoint index comprises at least one fixed-size fingerprint or limited-size fingerprint corresponding to sensitive data and wherein the endpoint index may be used for querying fingerprints of other data sources with the fingerprints contained in the endpoint index to determine if the other data sources contain content corresponding to the extracted content.

8. The system of claim 7, wherein the endpoint index comprises a mapping of at least some of the selected hashes in the stored fixed-size fingerprint or stored limited-size fingerprint to a plurality of data files that also include any of the plurality of fixed-size fingerprints or the limited-sized fingerprints representative of the content.

9. The system of claim 7, wherein the processor is further to:

apply a second hash function to each of the set of one or more data files to generate an exact-file fingerprint, wherein the second hash function comprises generating exact-file signatures of the set of one or more data files for use with a DLP further designed to detect exact matches; and store the exact-file fingerprints in the endpoint index for exact-file matching by the endpoint device.

10. The system of claim 9, wherein the processor is further to:

determine whether the content extracted comprises text data or non-text data;

apply a cryptographic hash function to the non-text data; and apply the hash function to the text data.

11. The system of claim 7, wherein the processor is further to:

normalize the content to generate a plurality of alpha numeric characters; and apply a k-gram operation to the plurality of alpha numeric characters; and apply a rolling hash function as the hash function.

12. The system of claim 7, wherein the processor is further to:

extract statistical information to model a distribution of the quantity of hashes from the fingerprints stored in the endpoint index; and select a query threshold based on the distribution, wherein the query threshold is selected by determining the maximum value of a subset of the smallest hashes of the hashes stored in the endpoint index.

13. A non-transitory computer readable storage medium including instructions that, when executed by a processor, cause the processor to perform operations comprising:

extracting content from a set of one or more data files to be protected by a data loss prevention (DLP) policy designed to detect resemblance or containment relationships between two files even when their contents are not exact matches, wherein the content comprises sensitive data and wherein the set of one or more data files comprises both sensitive data and non-sensitive data;

determining a size of the content;

applying a hash function to the content to generate a plurality of hashes;

selecting a constrained set of the plurality of hashes to generate a fixed-size fingerprint representative of the content when the size of the content is greater than a threshold size;

determining a quantity of hashes based on the size of the content when the size of the content is equal to or less than the threshold size, wherein the quantity is proportional to the size of the content and the determined quantity is less than the quantity of the plurality of hashes;

selecting the determined quantity of hashes from the plurality of hashes to generate a limited-size fingerprint representative of the content when the size of the content is equal to or less than the threshold size; and storing the fixed-size fingerprint or the limited-size fingerprint in an endpoint index for at least partial file content matching by an endpoint device, wherein the endpoint index comprises at least one fixed-size fingerprint or limited-size fingerprint corresponding to sensitive data and wherein the endpoint index may be used for querying fingerprints of other data sources with the fingerprints contained in the endpoint index to determine if the other data sources contain content corresponding to the extracted content.

14. The non-transitory computer readable storage medium of claim 13, wherein the endpoint index comprises a mapping of at least some of the selected hashes in the stored fixed-size fingerprint or stored limited-size fingerprint to a plurality of data files that also include any of the plurality of fixed-size fingerprints or the limited-sized fingerprints representative of the content.

15. The non-transitory computer readable storage medium of claim 13, wherein the hash function comprises:

applying a second hash function to each of the set of one or more data files to generate an exact-file fingerprint, wherein the second hash function comprises generating exact-file signatures of the set of one or more data files for use with a DLP further designed to detect exact matches; and storing the exact-file fingerprints in the endpoint index for exact-file matching by the endpoint device.

16. The non-transitory computer readable storage medium of claim 15, wherein the generating the exact-file signatures of the set of one or more data files comprises:

determining whether the content extracted comprises text data or non-text data; and applying a cryptographic hash function to the non-text data; and applying the hash function to the text data.

17. The non-transitory computer readable storage medium of claim 13, wherein the instructions, when executed by a processor, cause the processor to perform further operations comprising:

normalizing the content to generate a plurality of alpha numeric characters; and applying a k-gram operation to the plurality of alpha numeric characters, wherein applying the hash function to the content comprises applying a rolling hash function.

18. The method of claim 1, further comprising:

extracting statistical information to model a distribution of the quantity of hashes from the fingerprints stored in the endpoint index; and selecting a query threshold based on the distribution, wherein the query threshold is selected by determining the maximum value of a subset of the smallest hashes of each of the limited-size fingerprints and fixed-size fingerprints stored in the endpoint index.

19. The system of claim 7, wherein the processor is further to:
    extract statistical information to model a distribution of the quantity of hashes from the fingerprints stored in the endpoint index; and
    select a query threshold based on the distribution, wherein the query threshold is selected by determining the maximum value of a subset of the smallest hashes of each of the limited-size fingerprints and fixed-size fingerprints stored in the endpoint index.

20. The non-transitory computer readable storage medium of claim 13, wherein the instructions, when executed by a processor, cause the processor to perform further operations comprising:
    extracting statistical information to model a distribution of the quantity of hashes from the fingerprints stored in the endpoint index; and
    selecting a query threshold based on the distribution, wherein the query threshold is selected by determining the maximum value of a subset of the smallest hashes of each of the limited-size fingerprints and fixed-size fingerprints stored in the endpoint index.

* * * * *